United States Patent [19]

Johnson

[11] Patent Number: 5,012,974
[45] Date of Patent: May 7, 1991

[54] METHOD AND APPARATUS FOR APPLYING PREGERMINATED PLANTLETS

[76] Inventor: Jesse D. Johnson, 133 Lake View La., Brighton, Mich. 48116

[21] Appl. No.: 408,212

[22] Filed: Sep. 18, 1989

[51] Int. Cl.⁵ .............................................. B05B 9/03
[52] U.S. Cl. ........................................ 239/1; 239/142; 239/172
[58] Field of Search ................... 239/1, 142, 144, 172, 239/302

[56] References Cited

U.S. PATENT DOCUMENTS

| | | |
|---|---|---|
| 2,789,399 | 4/1957 | Finn . |
| 2,842,897 | 7/1958 | Finn . |
| 2,878,617 | 3/1959 | Finn . |
| 3,091,436 | 5/1963 | Finn . |
| 3,292,307 | 12/1966 | Finn . |
| 3,310,237 | 3/1967 | Welch .......................... 239/142 X |
| 3,512,713 | 5/1970 | Carlyon, Jr. ................. 239/142 X |
| 3,900,963 | 8/1975 | Tukacs . |
| 3,903,968 | 9/1975 | Livingston .................... 239/317 X |
| 4,155,314 | 5/1979 | O'Callaghan et al. . |
| 4,224,832 | 9/1980 | Cruse . |
| 4,296,875 | 10/1981 | Borglum ....................... 239/157 X |
| 4,297,810 | 11/1981 | Hansford . |
| 4,631,860 | 12/1986 | Broughton . |
| 4,658,539 | 4/1987 | Sluis . |
| 4,723,710 | 2/1988 | Lucore, II ..................... 239/172 X |
| 4,750,438 | 6/1988 | Johnson . |

Primary Examiner—Andres Kashnikow
Assistant Examiner—William Grant
Attorney, Agent, or Firm—Ian C. McLeod

[57] ABSTRACT

An apparatus (10) and method for broadcasting pregerminated seed plantlets onto the ground over a wide area is described. The apparatus uses a peristaltic pump (30), which is preferably driven by a hydraulic motor (28), so that the plantlets are not damaged by the broadcasting. The plantlets are provided in a preferred dispersion for broadcasting.

40 Claims, 6 Drawing Sheets

METHOD AND APPARATUS FOR APPLYING PREGERMINATED PLANTLETS

BACKGROUND OF THE INVENTION (1) Field of the Invention

The present invention relates to a method and apparatus for broadcasting pregerminated seed plantlets uniformly over a wide area of preprepared ground. In particular the present invention relates to an apparatus wherein the pumping system does not damage the plantlets as they are being broadcast.

(2) Prior Art

Hydroseeding is well known. In this method the seeds along with various fibers or the like are broadcast onto the ground. Generally the seeds and fibers are deposited on the ground together Illustrative prior art are U.S. Pat. Nos. 2,789,399; 2,842,897; 2,878,617; 3,091,436 to Finn; and 3,292,307 and 4,297,810 to Hansford. The problem is that the seeds may not germinate after planting.

U.S. Pat. Nos. 3,900,963 to Tukacs 4,155,314 to O'-Callaghan et al, 4,631,860 to Broughton and 4,658,539 to Sluis describes numerous advantages obtained from the sowing of pregerminated seeds. The problem has been that an apparatus for sowing plantlets produced from the pregerminated seeds without damage during the planting has not been available.

Pregerminated seed plantlets are very fragile and are easily destroyed by apparatus including conventional pumps with impellors. Thus, there is a need for apparatus to make the planting of pregerminated seed plantlets practical.

U.S. Pat. No. 4,224,882 to Cruse shows a coulter apparatus for planting seeds in a furrow. The apparatus is not designed for general planting of plantlets uniformly over a wide area of preprepared ground and the apparatus was not designed for planting plantlets.

OBJECTS

It is therefore an object of the present invention to provide an apparatus and method for dispersing pregerminated seed plantlets over a wide area without damaging the fragile plantlets. Further, it is an object of the present invention to provide an apparatus which is simple and economical to construct. Further still, it is an object of the present invention to provide an apparatus and method which are easy to use. These and other objects will become increasingly apparent by reference to the following description and the drawings.

GENERAL DESCRIPTION

The present invention relates to an apparatus adapted for broadcasting pregerminated seed plantlets in a particulate aqueous dispersion onto the ground which comprises: portable support means; a peristaltic pump means mounted on the support means with an inlet and an outlet for the dispersion from a housing wherein a flexible tubular member means between the inlet and the outlet is pinched by a compression means of the pump means and wherein a drive shaft extends from the housing and is connected to the compression means so as to rotate the compression means; drive means connected to the drive shaft for moving the compression means of the pump means to pinch the flexible tubular member and move the dispersion from the inlet to the outlet of the pump means; control means for selectively stopping and starting the drive means; first fluid conduit means mounted on the outlet of the pump means for broadcasting the dispersion; tank means mounted on the support means for holding the dispersion; a second fluid conduit means connected from the tank means to the fluid inlet of the pump means; and agitator means in the tank means for mixing the dispersion during broadcasting of the dispersion.

Further the present invention relates to the method for broadcasting the pregerminated seed plantlets which comprises: providing an apparatus adapted for broadcasting pregerminated seeds in a particulate aqueous dispersion onto the ground which comprises: portable support means; a peristaltic pump means mounted on the support means with an inlet and an outlet for the dispersion from a housing wherein a flexible tubular member means between the inlet and the outlet is pinched by a compression means of the pump means and wherein a drive shaft extends from the housing and is connected to the compression means so as to rotate the compression means; drive means connected to the drive shaft for moving the compression means of the pump means to pinch the flexible tubular member and move the dispersion from the inlet to the outlet of the pump means; control means for selectively stopping the drive means; first fluid conduit means mounted on the outlet of the pump means for broadcasting the dispersion; tank means mounted on the support means for holding the dispersion; and a second fluid conduit means connected from the tank means to the fluid inlet of the pump means; agitator means in the tank means for mixing the dispersion during broadcasting of the dispersion; providing the dispersion in the tank means; broadcasting the composition from the first conduit onto the ground from the first conduit means.

Finally, the present invention relates to an aqueous composition as a dispersion for broadcasting pregerminated seed plantlets onto the ground which comprises in admixture: pregerminated seed plantlets; a non-toxic water soluble or dispersible lubricant for the plantlets to aid in the dispersion; and water, wherein the composition contains between about 0.01 and 1 parts plantlets by volume and 0.001 and 0.1 parts lubricant by dry weight per part of water by volume (w/v).

SPECIFIC DESCRIPTION

Figure 1:
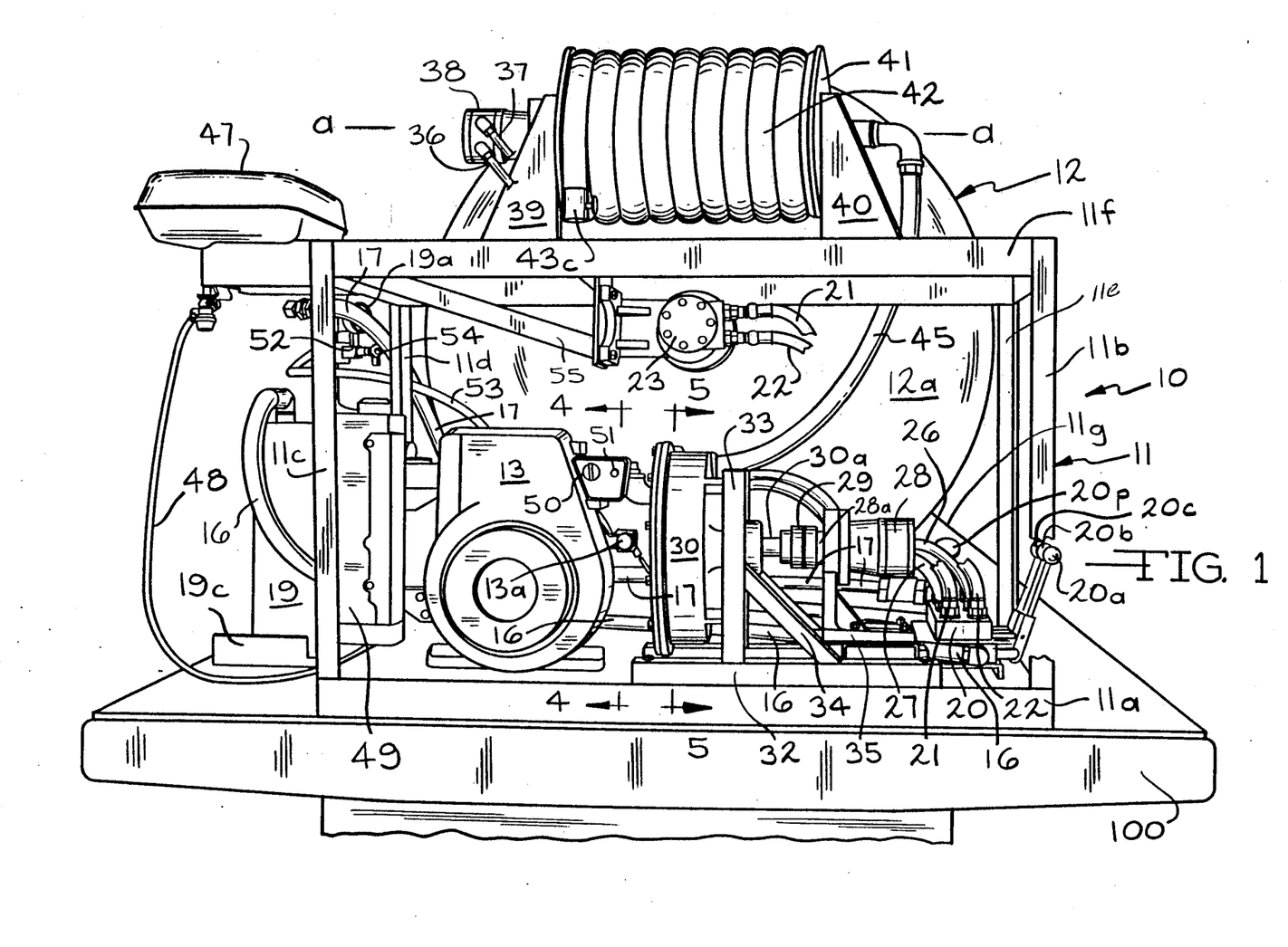
FIG. 1 is a perspective front view of the preferred apparatus of the present invention, particularly illustrating the mounting of a peristaltic pump 30 for dispersing pregerminated seed plantlets in a dispersion onto the ground from hose 42.
Figure 2:
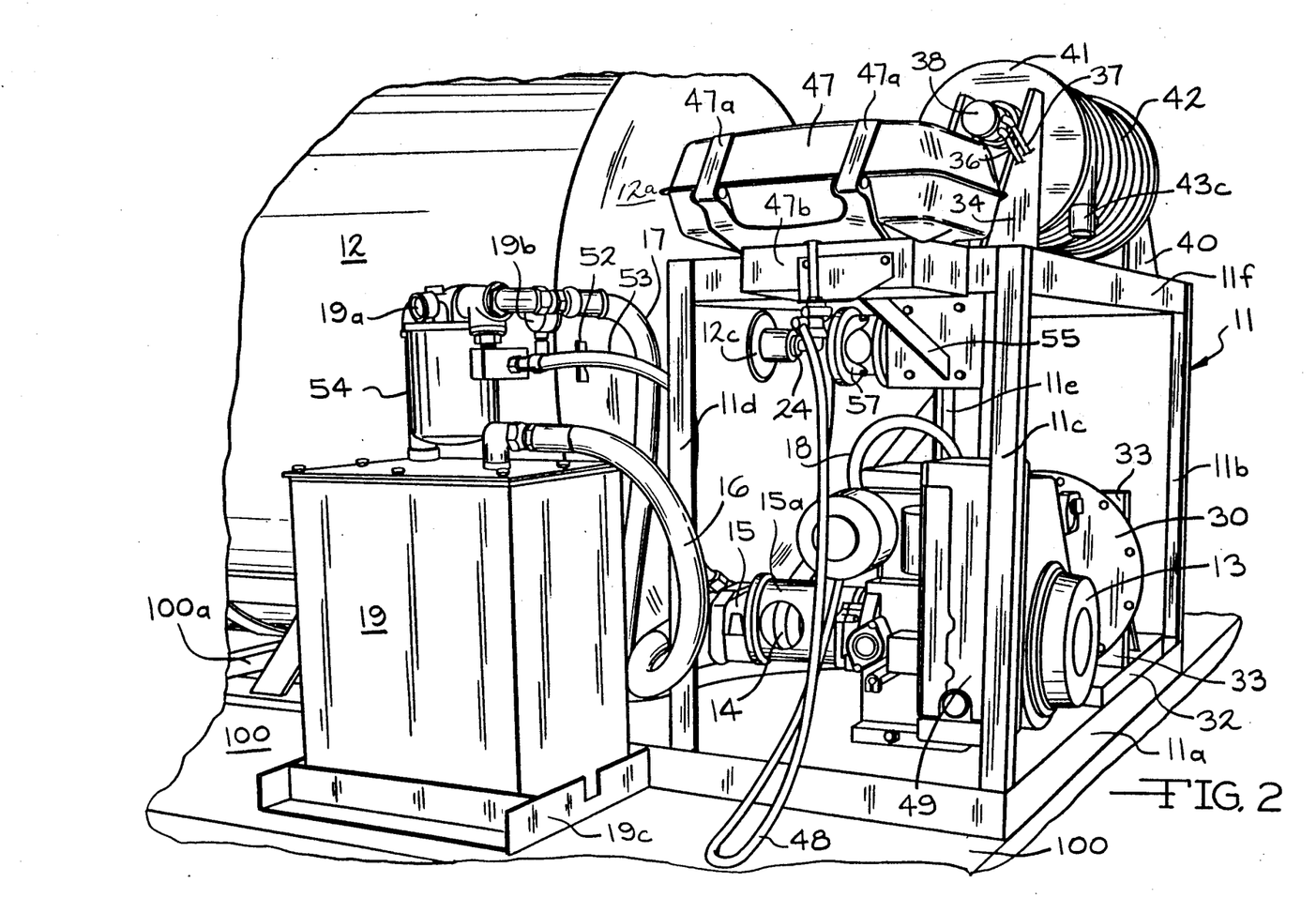
FIG. 2 is a left end view of FIG. 1, particularly showing hydraulic reservoir 19.
Figure 3:
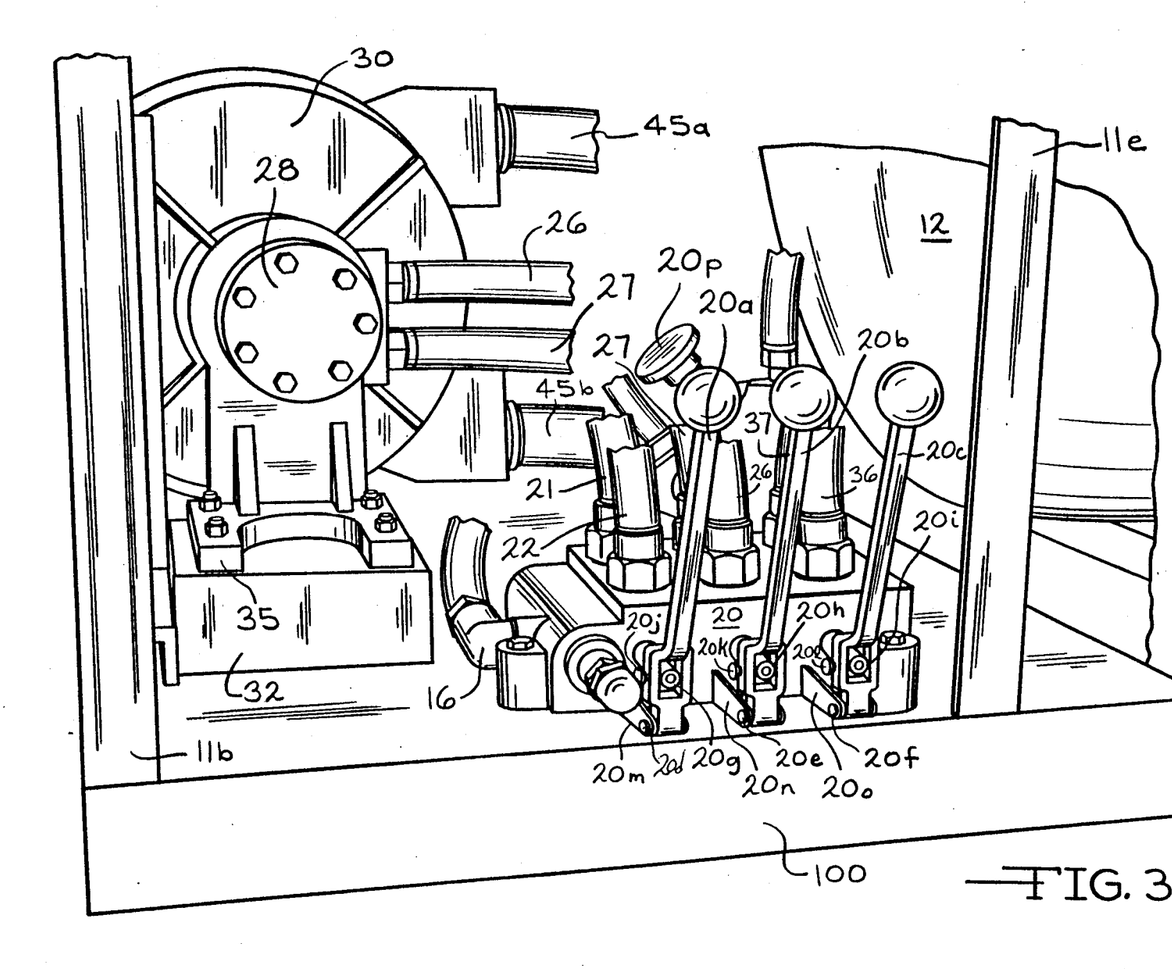
FIG. 3 is a right end view of FIG. 1 particularly showing levers 20*a*, 20*b* and 20*c*.
Figure 4:
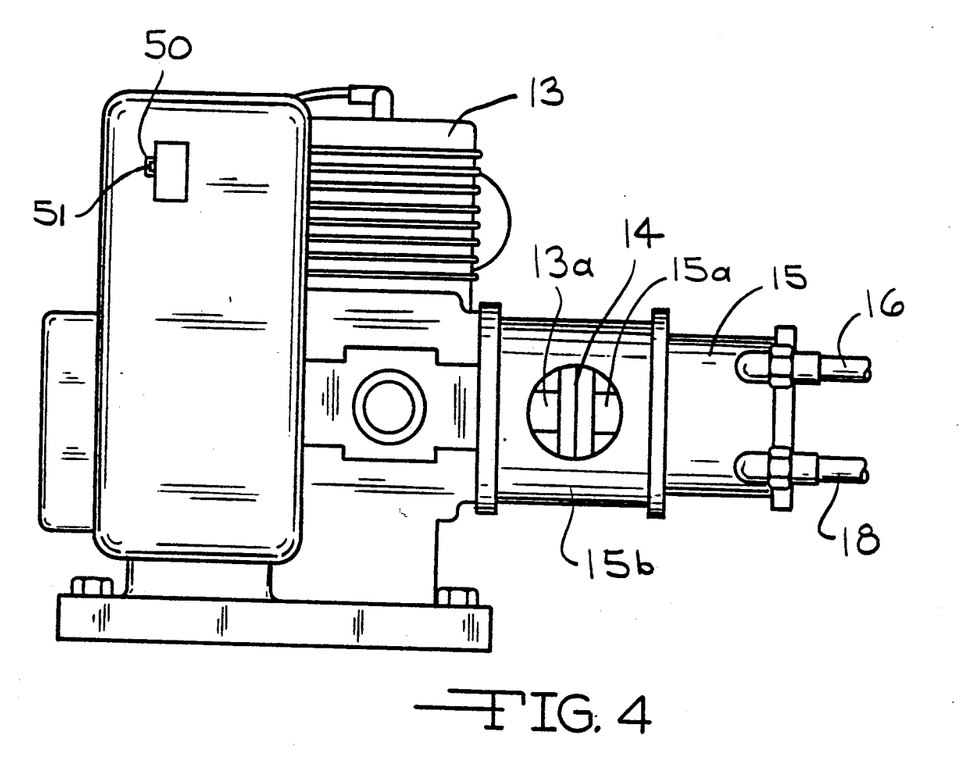
FIG. 4 is a view along line 4—4 of FIG. 1 showing the gasoline motor 13.
Figures 5, 6:
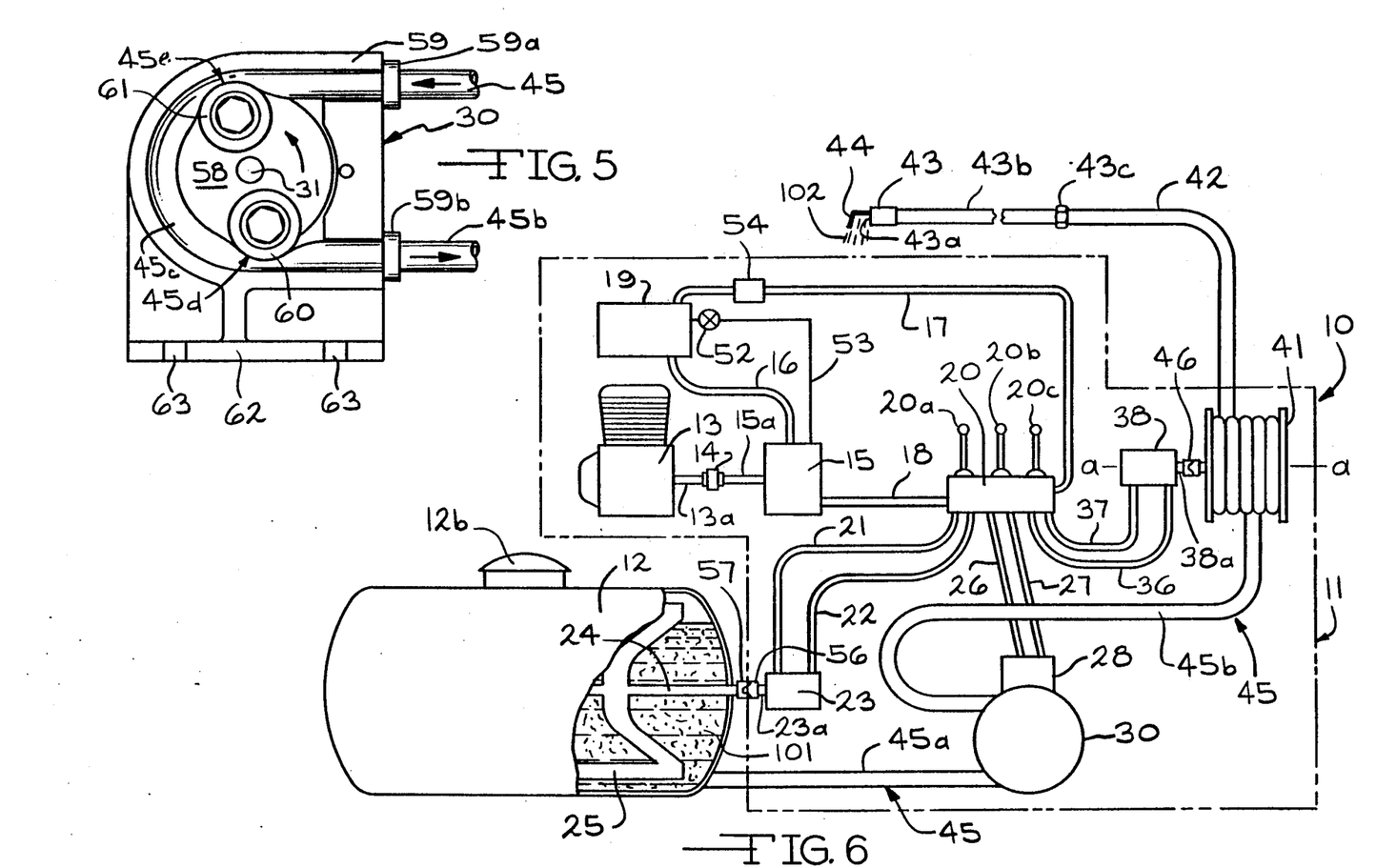
FIG. 5 is a cross-sectional view along line 5A—5A of FIG. 1 showing the peristaltic pump 30.

FIG. 6 is a schematic view of the apparatus 10 of FIG. 1 particularly showing a hydraulic pump 15 for supplying power to hydraulic motors 23, 28 and 38 by actuating levers 20*a*, 20*b* and 20*c*, respectively.
Figure 7:
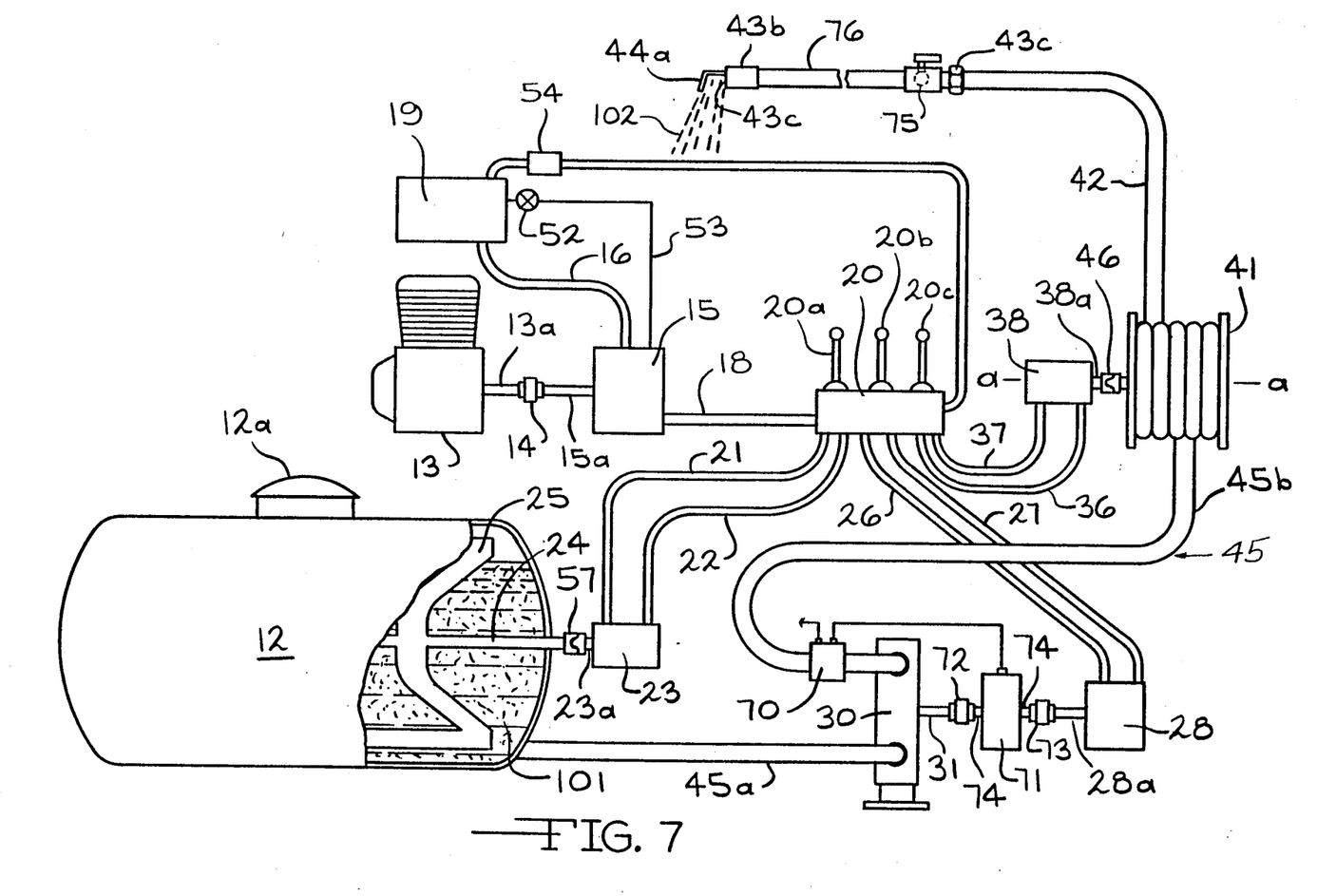
FIG. 7 is a schematic view showing a preferred pressure sensor 70 and clutch 71 for disengaging the pump 30 from the motor 28 when the pregerminated seed plantlet solution is not being dispersed by a nozzle 43*b*.

FIGS. 1 to 5 show the preferred apparatus 10 of the present invention for delivering the pregerminated seed plantlets onto the ground. FIG. 6 shows a schematic of the apparatus of FIGS. 1 to 5. FIG. 7 shows an improved version of the apparatus of FIG. 6.

Referring to FIGS. 1 to 4, an apparatus 10 is mounted on a truck bed 100 or other mobile trailer. An open frame 11 is mounted on the truck bed 100. The frame 11 has a rectangular base 11a, vertical posts 11b, 11c, 11d and 11e and a top 11f mounted on the posts 11b to 11e. Brace 11g aids in holding the frame 11 on bed 100. A tank 12, containing the pregerminated seed plantlets in an aqueous solution 101, is also mounted on the truck bed 100 with the frame 11 adjacent to one end 12a of the tank 12. The tank 12 includes a cover 12b (FIG. 6) for providing the pregerminated seed composition in the tank 12. Cradle 100a (FIG. 2) mounted on bed 100 holds tank 12 in place on bed 100. The pumping and mixing system described hereinafter for the pregerminated seed plantlet dispersion is mounted on the frame 11.

A gasoline engine 13 is mounted on the base 11a. The engine 13 is coupled through shaft 13a by means of universal joint 14 to shaft 15a (FIGS. 4 and 7) of in reverse direction. This merely requires a two-way valve (not shown) which reverses the flow of hydraulic fluid to the motors 23, 28 and 38.

The preferred dispersion 102 is set forth as follows in Table I.

TABLE I

| | | | |
|---|---|---|---|
| 80# wet | 1. Pregerminated seed | (10# Blue Grass Dry) (40# Perennial Rye Wet) (120# Mustang Wet) | Germinated 3 hours, can do 2 to 5 days added kelp and soap |
| 50# | 2. Phosphorus (calcium phosphate or other low salt, non-burn phosphorus compound) | | |
| 25# | 4. Nitrogen (non-soluble, slow release type microbial release) | | |
| 1 cup | 5. Dye | | |
| 8# | 6. H.B. made by Terrasorb HB absorbing agent, helps to keep from watering (swell up and hold 99.6% water) (water retention agent and lubricant) | | |
| ¼# | 7. Broadleaf P-4, helps lubricate seed chemical: Acrylamide Monomer less than .1% Polyacrylamide 94% | | |
| 1 cup | 8. Shaklee Basic-H Soap (organic cleaner and wetting agent) (lubricant and water retention agent) | | |
| | 9. 600 Gallons water | | |
| | 10. 30# Silica Fiber (Virgin Wood Fiber, strained by the dye for visualizing the dispersion on the ground) | | |

The carrier for the plantlets in water. The fertilizers (phosphorus or nitrogen) provide the growth of the seed and are usually applied with the plantlets. The lubricants can be polymers and natural materials which aid in dispersing the plantlets. The water retention agent can be the same as the lubricant and holds moisture around the plantlets after they are dispersed and can be various polymers and naturally occurring materials and is preferred. Usually about 0.001 to 0.1 parts by dry weight based upon the volume water is used. In all instances the materials are non-toxic.

It is intended that the foregoing description be only illustrative of the present invention and that the present invention be limited only by the hereinafter appended claims.

I claim:

1. An apparatus adapted for broadcasting pregerminated seed plantlets in a particulate aqueous dispersion onto the ground which comprises:

(a) a portable support means;

(b) a peristaltic pump means mounted on the support means with an inlet and an outlet for the dispersion from a housing wherein a flexible tubular member means between the inlet and the outlet is pinched by a compression means of the pump means and wherein a drive shaft extends from the housing and is connected to the compression means so as to rotate the compression means;

(c) a drive means connected to the drive shaft for moving the compression means of the pump means to pinch the flexible tubular member and move the dispersion from the inlet to the outlet of the pump means, wherein the drive means is actuated by a hydraulic system mounted on the apparatus;

(d) a control means connected between the output of the peristaltic pump means and the drive means for selectively stopping and starting the pump means;

(e) a first fluid conduit means for broadcasting the dispersion from an opening mounted on the outlet of the pump means which conveys fluid through a valve means which can be opened or closed wherein the control means stops the pump means when the valve means is closed;

(f) a tank means mounted on the support means for holding the dispersion;

(g) a second fluid conduit means connected from the tank means to the fluid inlet of the pump means; and (h) an agitator means in the tank means for mixing the dispersion during broadcasting of the dispersion.

2. The apparatus of claim 1 wherein the hydraulic system is connected by a first set of hoses to a first hydraulic motor mounted outside the tank means which rotates the agitator means in the tank means for the mixing and wherein the drive means is a second hydraulic motor connected by a second set of hoses to the hydraulic system.

3. The apparatus of claim 2 wherein the control means is a manifold connected into the hydraulic system with a first lever operated valve means in the manifold controlling a flow of hydraulic fluid through the second set of hoses connected to and from the second hydraulic motor and a second lever operated valve means in the manifold with controlling the flow of the fluid in the first set of hoses connected to and from the first hydraulic motor.

4. The apparatus of claim 3 wherein a third hydraulic motor is connected through a third set of hoses to the hydraulic system which rotates a reel mounted on the support means which coils and uncoils the first conduit means and wherein a third lever operated valve means is provided in the manifold controlling the flow of fluid through the third set of hoses connected to and from the third hydraulic motor.

5. The apparatus of claim 4 wherein the first fluid conduit has a head means at the opening which broadcasts the dispersion as a spray without constricting the flow of the dispersion.

6. The apparatus of claim 2 wherein a third hydraulic motor is connected by a third set of hoses to the hydraulic system which rotates a reel mounted on the support means so as to coil and uncoil the first conduit means.

7. The apparatus of claim 1 wherein the hydraulic system is connected by first set of hoses to a first hydraulic motor mounted outside the tank means which rotates the agitator means in the tank means, wherein the drive means is a second hydraulic motor connected by a second set of hoses to the hydraulic system and wherein a gasoline motor is mounted on the support means and coupled to the hydraulic system to move a hydraulic fluid in the system.

8. The apparatus of claim 7 wherein the first fluid conduit means has a head means at the opening which broadcasts the dispersion as a spray without constricting the flow of the dispersion.

9. The apparatus of claim 1 wherein the first fluid conduit means has a head means at the opening which broadcasts the dispersion as a spray without constricting the flow of the dispersion.

10. A method for broadcasting pregerminated seed plantlets which comprises:

(a) providing an apparatus adapted for broadcasting pregerminated seed plantlets in a particulate aqueous dispersion onto the ground which comprises: a portable support means; a peristaltic pump means mounted on the support means with an inlet and an outlet for the dispersion from a housing wherein a flexible tubular member means between the inlet and the outlet is pinched by a compression means of the pump means and wherein a drive shaft extends from the housing and is connected to the compression means so as to rotate the compression means; a drive means connected to the drive shaft for moving the compression means of the pump means to pinch the flexible tubular member and move the dispersion from the inlet to the outlet of the pump means, wherein the drive means is actuated by a hydraulic system mounted on the apparatus; a control means connected between the output of the peristaltic pump means and the drive means for selectively stopping and starting the pump means; a first fluid conduit means for broadcasting the dispersion from an opening mounted on the outlet of the pump means which convey fluid through a valve means which can be opened or closed wherein the control means stops the pump means when the valve means is closed; tank means mounted on the support means for holding the dispersion; and a second fluid conduit means connected from the tank means to the fluid inlet of the pump means; an agitator means in the tank means for mixing the dispersion during broadcasting of the dispersion;

(b) providing the dispersion in the tank means; and
(c) broadcasting the dispersion from the first conduit onto the ground from the first conduit means.

11. The method of claim 10 wherein the dispersion includes a solid material which serves as a visual marker after the dispersion is broadcast onto the ground.

12. The method of claim 11 wherein the dispersion contains a dyed cellulose material as the marker.

13. The method of claim 10 wherein the plantlets are grass.

14. An apparatus adapted for broadcasting pregerminated seed plantlets in a viscous, particulate aqueous dispersion onto the ground which comprises:
(a) portable support means;
(b) a peristaltic pump means mounted on the support means with an inlet and an outlet for the dispersion from a housing wherein a flexible tubular member means between the inlet and the outlet is pinched by a compression means of the pump means and wherein a drive shaft extends from the housing and is connected to the compression means so as to rotate the compression means;
(c) drive means operated by a hydraulic system connected to the drive shaft of the pump for moving the compression means of the pump means to pinch the flexible tubular member and move the dispersion from the inlet to the outlet of the pump means;
(d) control means for selectively stopping and starting the pump means;
(e) first fluid conduit means mounted on the outlet of the pump means for broadcasting the dispersion from an opening;
(f) tank means mounted on the support means for holding the dispersion;
(g) a second fluid conduit means connected from the tank means to the fluid inlet of the pump means;
(h) agitator means in the tank means for mixing the dispersion during broadcasting;
(i) valve means on the first fluid conduit means which selectively stops and starts flow of the dispersion from the opening in the conduit means by activating and deactivating a clutch means between the drive shaft of the pump means and the drive means; and
(j) pressure sensing means in the first conduit means which stops the flow of the dispersion in the first and second conduit means by actuating the clutch means.

15. The apparatus of claim 14 wherein the hydraulic operated system is mounted on the support means which is connected by a first set of hoses to a first hydraulic motor mounted outside the tank means which rotates the agitator means in the tank means for the mixing and wherein the drive means is a second hydraulic motor connected by a second set of hoses to the hydraulic system.

16. The apparatus of claim 15 wherein a third hydraulic motor is connected by a third set of hoses to the hydraulic system which rotates a reel mounted on the support means which coils and uncoils the first conduit means and wherein a third lever operated valve means is provided in the manifold connected by the third set of hoses to the third hydraulic motor.

17. The apparatus of claim 16 wherein the first fluid conduit has a head means at the opening which broadcasts the dispersion as a spray without constricting the flow of the dispersion.

18. The apparatus of claim 15 wherein a manifold connected into the hydraulic system with a first lever operated valve means in the manifold connected by the second set of hoses to the second hydraulic motor and a second lever operated valve means in the manifold connected by the first set of hoses to the first hydraulic motor wherein the valve means control the flow of a hydraulic fluid in the hoses.

19. The apparatus of claim 14 wherein the hydraulic system is mounted on the support means which is connected by a first set of hoses to the first hydraulic motor mounted outside the tank means which rotates the agitator means in the tank means wherein the drive means is a second hydraulic motor connected by a second set of hoses to the hydraulic system and wherein a gasoline motor is mounted on the support means and coupled to the hydraulic system to move a hydraulic fluid in the system.

20. The apparatus of claim 19 wherein the first fluid conduit means has a head means at the opening which broadcasts the dispersion as a spray without constricting the flow of the dispersion.

21. The apparatus of claim 14 wherein the first fluid conduit means has a head means at the opening which broadcasts the dispersion as a spray without constricting the flow of the dispersion.

22. The apparatus of claim 14 wherein a third hydraulic motor is connected by a third set of hoses to the hydraulic system which rotates a reel mounted on the support means so as to coil and uncoil the first conduit means.

23. A method for broadcasting germinated seed plantlets which comprises:
(a) providing an apparatus adapted for broadcasting pregerminated seed plantlets in a particulate aqueous dispersion onto the ground which comprises: a portable support means; a peristaltic pump means mounted on the support means with an inlet and an outlet for the dispersion from a housing wherein a flexible tubular member means between the inlet and the outlet is pinched by a compression means of the pump means and wherein a drive shaft extends from the housing and connected to the compression means so as to rotate the compression means; a drive means connected to the drive shaft for moving the compression means of the pump means to pinch the flexible tubular member and move the dispersion from the inlet to the outlet of the pump means; a control means connected between the output of the peristaltic pump means and the drive means in a hydraulic system for stopping and starting the pump means with a valve means connected to a hydraulic motor as the drive means for selectively stopping and starting the control means for the pump means; a first fluid conduit means for broadcasting the dispersion from an opening mounted on the outlet of the pump means which conveys fluid through the valve means which can be opened or closed wherein the control means stops the pump means when the valve means is closed; tank means mounted on the support means for holding the dispersion; a second fluid conduit means connected from the tank means to the fluid inlet of the pump means; and an agitator means in the tank means for mixing the dispersion during broadcasting of the dispersion;

(b) providing a composition as the dispersion for broadcasting the pregerminated seed plantlets which comprises in admixture: pregerminated seed plantlets; a non-toxic water soluble or dispersible lubricant for the plantlets and water; and (c) broadcasting the composition from the first conduit onto the ground by opening the valve means and stopping the broadcasting by closing the valve means.

24. The method of claim 23 including a solid material which serves as a visual marker after the composition is broadcast onto the ground.

25. The method of claim 24 wherein the composition contains a dyed cellulose material as the marker.

26. The method of claim 23 wherein a lubricant agent selected from the group consisting of cellulose, mulch or fiber is provided in the composition.

27. The method of claim 23 wherein the lubricant for the plantlets is selected from polymers and natural materials.

28. The method of claim 23 wherein the plantlets are pregerminated grass seed plantlets.

29. An apparatus adapted for broadcasting pregerminated seed plantlets in a particulate aqueous dispersion onto the ground which comprises:

(a) portable support means;

(b) a peristaltic pump means mounted on the support means with an inlet and an outlet for the dispersion from a housing wherein a flexible tubular member means between the inlet and the outlet is pinched by a compression means of the pump means and wherein a drive shaft extends from the housing and is connected to the compression means so as to rotate the compression means;

(c) drive means connected to the drive shaft for moving the compression means of the pump means to pinch the flexible tubular member and move the dispersion from the inlet to the outlet of the pump means;

(d) control means including a clutch means for selectively stopping and starting the pump means without stopping the drive means;

(e) first fluid conduit means mounted on the outlet of the pump means for broadcasting the dispersion from an opening;

(f) tank means mounted on the support means for holding the dispersion;

(g) a second fluid conduit means connected from the tank means to the fluid inlet of the pump means;

(h) agitator means in the tank means for mixing the dispersion during broadcasting of the dispersion; and (i) actuation means for selectively actuating and deactuating the clutch means.

30. A method for broadcasting germinated seed plantlets which comprises:

(a) providing an apparatus adapted for broadcasting pregerminated seed plantlets in a particulate aqueous dispersion onto the ground which comprises: portable support means; a peristaltic pump means mounted on the support means with an inlet and an outlet for the dispersion from a housing wherein a flexible tubular member means between the inlet and the outlet is pinched by a compression means of the pump means and wherein a drive shaft extends from the housing and connected to the compression means so as to rotate the compression means; drive means connected to the drive shaft for moving the compression means of the pump means to pinch the flexible tubular member and move the dispersion from the inlet to the outlet of the pump means; control means including a clutch means for selectively stopping and starting the pump means without stopping the drive means; first fluid conduit means mounted on the outlet of the pump means for broadcasting the dispersion; tank means mounted on the support means for holding the dispersion; and a second fluid conduit means connected from the tank means to the fluid inlet of the pump means; agitator means in the tank means for mixing the dispersion during broadcasting of the dispersion and actuation means for selectively actuating and deactuating the clutch means;

(b) providing a composition as the dispersion for broadcasting the pregerminated seed plantlets which comprises in admixture: pregerminated seed plantlets; a non-toxic water soluble or dispersible lubricant for the plantlets and water; and (c) broadcasting the composition from the first conduit onto the ground, wherein the clutch means is actuated by the actuation means to stop the pump means and the broadcasting of the plantlets.

31. The method of claim 30 where the dispersion contains a solid material which acts as a visual marker after the solution is dispersed.

32. The method of claim 30 wherein the dispersion contains dyed cellulose material as the solid material marker.

33. An apparatus adapted for broadcasting pregerminated seed plantlets in a particulate aqueous dispersion onto the round which comprises:

(a) a portable support means;

(b) a peristaltic pump means mounted on the support means with an inlet and an outlet for the dispersion from a housing wherein a flexible tubular member means between the inlet and the outlet is pinched by a compression means of the pump means and wherein a drive shaft extends from the housing and is connected to the compression means so as to rotate the compression means;

(c) a drive means connected to the drive shaft for moving the compression means of the pump means to pinch the flexible tubular member and move the dispersion from the inlet to the outlet of the pump means, wherein the drive means is actuated by a hydraulic system mounted on the apparatus;
(d) a control means for selectively stopping and starting the pump means;
(e) a first fluid conduit means mounted on the outlet of the pump means for broadcasting the dispersion from an opening;
(f) a tank means mounted on the support means for holding the dispersion.
(g) a second fluid conduit means connected from the tank means to the fluid inlet of the pump means;
(h) an agitator means in the tank means for mixing the dispersion during broadcasting of the dispersion;
(i) a first hydraulic motor mounted outside the tank means and connected by a first set of hoses to the hydraulic system, which rotates the agitation means on the tank means for mixing; and
(j) a second hydraulic motor as the drive means connected by a second set of hoses to the hydraulic system.

34. The apparatus of claim 33 wherein the control means is a manifold connected into the hydraulic system with a first lever operated valve means in the manifold controlling a flow of hydraulic fluid through the second set of hoses connected to and from the second hydraulic motor and a second lever operated valve means in the manifold with controlling the flow of the fluid in the first set of hoses connected to and from the first hydraulic motor.

35. The apparatus of claim 34 wherein a third hydraulic motor is connected through a third set of hoses to the hydraulic system which rotates a reel mounted on the support means which coils and uncoils the first conduit means and wherein a third lever operated valve means is provided in the manifold controlling the flow of fluid through the third set of hoses connected to and from the third hydraulic motor.

36. The apparatus of claim 35 wherein the first fluid conduit has a head means at the opening which broadcasts the dispersion as a spray without constricting the flow of the dispersion.

37. The apparatus of claim 33 wherein the first fluid conduit means has a head means at the opening which broadcasts the dispersion as a spray without constricting the flow of the dispersion.

38. The apparatus of claim 33 wherein a third hydraulic motor is connected by a third set of hoses to the hydraulic system which rotates a reel mounted on the support means so as to coil and uncoil the first conduit.

39. A method for broadcasting pregerminated seed plantlets which comprises:
(a) providing an apparatus adapted for broadcasting pregerminated seed plantlets in a particulate aqueous dispersion onto the ground which comprises: portable support means; a peristaltic pump means mounted on the support means with an inlet and an outlet for the dispersion from a housing wherein a flexible tubular member means between the inlet and the outlet is pinched by a compression means of the pump means and wherein a drive shaft extends from the housing and is connected to the compression means so as to rotate the compression means; drive means connected to the drive shaft for moving the compression means of the pump means to pinch the flexible tubular member and move the dispersion from the inlet to the outlet of the pump means, wherein the drive means is actuated by a hydraulic system mounted on the apparatus; control means for selectively stopping and starting the pump means; first fluid conduit means mounted on the outlet of the pump means for broadcasting the dispersion wherein the dispersion contains a dyed cellulose material as a solid material which serves as a visual marker after the dispersion is broadcast onto the ground; tank means mounted on the support means for holding the dispersion; and a second fluid conduit means connected from the tank means to the fluid inlet of the pump means; agitator means in the tank means for mixing the dispersion during broadcasting of the dispersion;
(b) providing the dispersion in the tank means; and
(c) broadcasting the dispersion from the first conduit onto the ground from the first conduit means.

40. A method for broadcasting germinated seed plantlets which comprises:
(a) providing an apparatus adapted for broadcasting pregerminated seed plantlets in a particulate aqueous dispersion onto the ground which comprises: a portable support means; a peristaltic pump means mounted on the support means with an inlet and an outlet for the dispersion from a housing wherein a flexible tubular member means between the inlet and the outlet is pinched by a compression means of the pump means and wherein a drive shaft extends from the housing and connected to the compression means so as to rotate the compression means; a drive means connected to the drive shaft for moving the compression means of the pump means to pinch the flexible tubular member and move the dispersion from the inlet to the outlet of the pump means; a control means in a hydraulic system with valve means connected to a hydraulic motor as the drive means for selectively stopping and starting the pump means; a first fluid conduit means mounted on the outlet of the pump means for broadcasting the dispersion wherein the dispersion contains a dyed cellulose material as a solid material which serves as a visual marker after the dispersion is broadcast onto the ground; a tank means mounted on the support means for holding the dispersion; a second fluid conduit means connected from the tank means to the fluid inlet of the pump means; and an agitator means in the tank means for mixing the dispersion during broadcasting of the dispersion;
(b) providing a composition as the dispersion for broadcasting the pregerminated seed plantlets which comprises in admixture: pregerminated seed plantlets; a non-toxic water soluble or dispersible lubricant for the plantlets and water; and
(c) broadcasting the composition from the first conduit onto the ground by opening the valve means and stopping the broadcasting by closing the valve means.

* * * * *

UNITED STATES PATENT AND TRADEMARK OFFICE
CERTIFICATE OF CORRECTION

PATENT NO. : 5,012,974

DATED : 5/7/91

INVENTOR(S) : Jesse D. Johnson

It is certified that error appears in the above-identified patent and that said Letters Patent is hereby corrected as shown below:

Column 4, line 3, "20by" should read --20i by--.

Column 4, line 4, "201" should read --20l--.

Column 5, Table I, the items are misnumbered, "4" should become --3-- and the remainder numbered consecutively.

Column 10, line 56 (Claim 33), "round" should be --ground--.

Column 11, line 50 (Claim 38), after "conduit", --means-- should be inserted.

Signed and Sealed this

Twenty-seventh Day of October, 1992

Attest:

DOUGLAS B. COMER

Attesting Officer

Acting Commissioner of Patents and Trademarks